United States Patent [19]

Mohri et al.

[11] 4,220,670
[45] Sep. 2, 1980

[54] METHOD FOR CHEMICALLY PEELING FRUITS AND VEGETABLES

[75] Inventors: Zenichi Mohri, Wakayama; Tetsuhiko Tominaga, Takarazuka; Junichi Tamura, Wakayama; Shigeru Otsuka, Toyonaka, all of Japan

[73] Assignees: Toyo Seikan Kaisha, Ltd.; Kao Soap Co., Ltd., both of Tokyo, Japan

[21] Appl. No.: 35,507

[22] Filed: May 3, 1979

[30] Foreign Application Priority Data

May 15, 1978 [JP] Japan .................................. 53-57429
May 15, 1978 [JP] Japan .................................. 53-57430

[51] Int. Cl.³ .............................................. A23L 1/212
[52] U.S. Cl. ................................... 426/287; 426/482; 426/615

[58] Field of Search ................ 426/287, 288, 615, 482

[56] References Cited

U.S. PATENT DOCUMENTS

| 3,307,601 | 3/1967 | Aepli ................................... 426/287 |
| 4,130,668 | 12/1978 | Otsuka et al. ........................ 426/287 |

FOREIGN PATENT DOCUMENTS 47-26294  7/1972  Japan ...................................... 426/287

*Primary Examiner*—Arthur L. Corbin
*Attorney, Agent, or Firm*—Blanchard, Flynn, Thiel, Boutell & Tanis

[57] ABSTRACT

Fruits and vegetables can be chemically peeled by dipping them in an alkali aqueous solution containing fatty acids having 10 to 18 carbon atoms.

14 Claims, No Drawings

METHOD FOR CHEMICALLY PEELING FRUITS AND VEGETABLES

The present invention relates to a method for chemically peeling fruits or vegetables.

Fruits or vegetables are eaten in the fresh state, and further, they are often preserved after processing in the form of bottled, canned and frozen foods. Many fruits or vegetables should be subjected to a peeling treatment when these processed foods are manufactured.

As the conventional methods for the peeling treatment for processing of fruits or vegetables, there can be mentioned (1) so-called hot water peeling methods in which the rind or peel is damaged by hot water or steam and is then removed, (2) alkali peeling methods in which a fruit or vegetable is dipped in or showered with an alkali solution, (3) acid peeling methods in which a fruit or vegetable is dipped in an acid solution, (4) a method using an acid and an alkali in combination, (5) enzymatic peeling methods using enzymes, and (6) mechanical peeling methods. The methods (1) are applied to peeling of white peaches, methods (2) are applied to peeling of peaches and apples, the method (4) is applied to peeling of oranges, and the methods (6) are applied to peeling of apples and pears. The methods (3) and (5) have not been put into practical application.

The method (1) is defective in that a troublesome operation is necessary for making the ripening degree uniform, and therefore, this method is not suitable for mass production. The methods (2) and (3) are advantageous over the methods (1) in that the treatment can be accomplished in a short time and mass production can be performed conveniently, but they are defective in that because of the strong action of the chemicals used, such disadvantages as surface roughening, collapse of flesh, reduction of the yield by excessive peeling and discoloration of flesh are caused. In the methods (1), the degree of damaging of flesh is lower than in the methods (2) and (3), but in the method (3), since hydrochloric acid is used, corrosion of the equipment cannot be avoided and a large quantity of a neutralizing agent should be used for neutralizing hydrochloric acid at the waste water treatment. Moreover, since waste water which is poor in the chemical coagulating or precipitating property is produced, a chemical pretreatment is necessary, and the BOD (biochemical oxygen demand) load necessary for the biological treatment is still very high and large expenses are required for the waste water treatment. The methods (5) involves a practical problem of a long treatment time, and in some cases, not only the rind but also the flesh is damaged to cause surface roughening and collapse of flesh. The method (6) is defective in that the application field is limited, large expenses are required and a large loss is caused.

Furthermore, there has been proposed a method in which a specific surface active agent, that is, sodium alkyl benzene-sulfonate, is used and incorporated at a high concentration (at least 10%) into an alkali aqueous solution, and a method in which a polyoxyethylene alkyl ether or polyoxyethylene alkylaryl ether is used for the above-mentioned treatment using an acid and an alkali in combination. In these methods, however, degradation of the quality, reduction of the operation efficiency and decrease of the yield are observed, and problems involved in the conventional methods such as mentioned above are not solved even according to these methods.

The present invention has been completed based on the results of our researches made with a view to developing a method in which the foregoing defects involved in the conventional methods can be solved, the yield, quality and operation efficiency can be improved and the processing and waste water treatment can be performed economically and advantageously.

More specifically, in order to attain the above object, we investigated oils, fats, surface active agents and the like in the peeling treatment of fruits and vegetables, and we found that if a fruit or vegetable is dipped in an alkali aqueous solution containing specific fatty acids, the peeling treatment can be performed very effectively and the above object can be attained.

In accordance with the present invention, there is provided a method for peeling fruits or vegetables which comprises dipping a fruit or vegetable in an alkali aqueous solution containing fatty acids having 10 to 18 carbon atoms and subjecting the fruit or vegetable to the peeling treatment.

According to the present invention, an excellent peeling effect can be attained at a low alkali concentration (lower than 3%) at which no substantial peeling effect can be attained when sodium alkyl benzene-sulfonate is used for the alkali peeling treatment or when a polyoxyethylene alkyl ether or polyoxyethylene alkylaryl ether is used for the acid-alkali peeling treatment, and furthermore, the treatment time can be remarkably shortened.

The fatty acids that are used in the present invention have 10 to 18 carbon atoms. In the present invention, there can be used saturated and unsaturated fatty acids having 10 to 18 carbon atoms, such as capric acid, undecylenic acid, lauric acid, myristic acid, palmitic acid, palmitoleic acid, oleic acid, linoleic acid, linolenic acid and stearic acid.

Fatty acids having more than 18 carbon atoms are hardly available and the practical utility thereof is low. Fatty acids having less than 10 carbon atoms, such as valeric acid, caproic acid, caprylic acid and pelargonic acid, have no substantial peeling effect and have peculiar undesirable smells, and they have no practical utility and cannot be used in the present invention.

The fatty acid is used in an amount of 0.005 to 1.0% by weight, preferably 0.1 to 1.0% by weight, based on the alkali aqueous solution. Even if the amount is increased beyond this range, no further improvement of the peeling effect can be attained, but bubbling becomes conspicuous and the operation efficiency is reduced, resulting in economical disadvantages.

As the fruit that is peeled according to the present invention, there can be mentioned, for example, orange, peach, apple, apricot, loquat, grape, pear, fig and persimmon, and as the vegetable that is peeled according to the present invention, there can be mentioned, for example, tomato, potato, sweet potato, cucumber and radish.

In the conventional alkali peeling method using an alkali aqueous solution alone, when peach, apricot or apple is peeled, an aqueous solution having such a high caustic soda concentration as 5 to 30% by weight is employed. In contrast, in the present invention, a sufficient effect can be attained when the alkali concentration is as low as 0.1 to 3% by weight, ordinarily about 0.2 to about 0.5% by weight.

According to the present invention, there can be provided a high-quality processed food excellent in the properties of flesh hardness, flavor and luster. Moreover, the ratio of generation of the broken fruit or vegetable can be remarkably reduced, the surface roughening can be prominently moderated, the yield can be increased and the browning speed of the flesh can be remarkably reduced. Still further, the peeling treatment can be performed at a relatively low temperature smoothly and completed in a short time. The waste water from the peeling step can be coagulated and precipitated by calcium hydroxide more easily than the waste water from the conventional acid-alkali peeling step. Accordingly, the disadvantage of the conventional method that because of a high BOD load, the waste water treatment is not promptly performed by the activated sludge treatment method can be eliminated in the present invention.

According to the invention, there is also provided a method for peeling fruits or vegetables which comprises dipping a fruit or vegetable in an alkali aqueous solution containing (1) fatty acids having 10 to 18 carbon atoms and (2) at least one non-ionic surface active agent having an HLB value of 6 to 18, which is selected from the group consisting of polyoxyethylene sorbitan fatty acid esters, sucrose fatty acid esters, sorbitan fatty acid esters, glycerin fatty acid esters and propylene glycol fatty acid esters, and subjecting the fruit or vegetable to the peeling treatment.

The polyoxyethylene sorbitan fatty acid ester having an HLB value of 6 to 18, that is used in the present invention, is preferably formed by adding 3 to 30 moles of ethylene oxide to a sorbitan fatty acid ester derived from a fatty acid having 8 to 18 carbon atoms.

In the sucrose fatty acid ester, sorbitan fatty acid ester, glycerin fatty acid ester and propylene glycol fatty acid ester, that are used in the present invention, the carbon number in the fatty acid portion is 6 to 18, preferably 12 to 18. In short, the carbon number in the fatty acid portion constituting the non-ionic surface active agent having an HLB value of 6 to 18, that is used in the present invention, is preferably 6 to 18.

Such polyhydroxyl compound fatty acid ester that is used in the present invention may be a monoester, a diester or a mixture of a monoester and a diester or of a monoester, a diester and a triester. For example, in case of the sucrose fatty acid ester, there may be employed a mixture comprising 35% of a monolauryl ester and 65% of di- and tri-lauryl esters (HLB value=9.0), and a mixture comprising 40% of a monooleyl ester and 60% of di- and tri-oleyl esters (HLB value=9.0). In the case of the sorbitan fatty acid, there may be employed, for example, a mixture comprising 30% of a monolauryl ester and 70% of di- and tri-lauryl esters (HLB value=8.5).

In the present invention, a mixture of a non-ionic surface active agent having a low HLB value and a non-ionic surface active agent having a high HLB value can be used, so far as the HLB value of the mixture is in the range of from 6 to 18. For example, there can be used a mixture (HLB value=9.0) comprising equal amounts of sucrose monooleate (HLB value=13.0) and glycerin mono-oleate (HLB value=5.0).

As is well-known, the term "HLB" used herein is an abbreviation to the hydrophilic-lipophilic balance. The HLB value is used for selection of an appropriate surface active agent and estimation of the effect thereof. Namely, the surface active agent is an amphiphatic compound having both the hydrophilic and lipophilic groups in the structure thereof, and because of this specific characteristic, the surface active agent exerts a surface-activating capacity.

The method proposed by Griffin [J. Soc. Cosmetic Chemists, 5, 249 (1054)] is now ordinarily adopted for calculation of HLB values. For example, in case of polyoxyethylene sorbitan fatty acid esters, sucrose fatty acid esters and the like, an HLB value is calculated according to the following formula:

$$HLB = 20(1 - S/A)$$

wherein S stands for the saponification value of the fatty acid ester and A stands for the neutralization value of the fatty acid.

As the HLB value is small, the lipophilic characteristic is increased, and as the HLB value is large, the hydrophilic characteristic is increased. In the art, it is known that the following relation is established between the HLB value of a surface active agent and its water solubility.

| HLB Value | Water Solubility |
| --- | --- |
| 1-4 | not dispersed |
| 3-6 | hardly dispersed |
| 6-8 | emulsified dispersion |
| 8-13 | semi-transparent or transparent dispersion |
| above 13 | transparent solution |

In the present invention, the non-ionic surface active agent having an HLB value of 6 to 18 is used in an amount of 0.005 to 1.0% by weight based on the alkali aqueous solution. Even if the non-ionic surface active agent is used in an amount exceeding the above range, no further improvement of the peeling effect can be attained, but bubbling becomes conspicuous and the operation efficiency is degraded, resulting in economical disadvantages.

The characters and effects of the method of the present invention will now be described in detail by reference to the following Examples that by no means limit the scope of the invention. In these Examples, all references to "%" are by weight.

EXAMPLE 1

In this Example, peeling of white peaches is illustrated.

White peaches were dipped in hot water for 30 seconds and each fruit was cut into 4 pieces. The cut pieces were subjected to the peeling treatment in a peeling solution maintained at a predetermined temperature for a certain period. After the treatment, the treated fruit pieces were dipped in a 0.05 N aqueous solution of citric acid for 30 seconds and washed with water, and the peeling ratio was examined. The peeling ratio means the ratio of the number of completely peeled fruit pieces to the total number of the treated fruit pieces. The obtained results are shown in Table 1.

White peaches treated with the peeling solutions of Sample Nos. 3, 4, 7 and 8 shown in Table 1 were examined with respect to the browning speed, hardness and flavor to obtain the results shown in Table 2.

Table 1

| Sample No. | Peeling Solution | Treatment Time (min) | Treatment Temperature (°C.) | Peeling Ratio (%) |
|---|---|---|---|---|
| Present Invention | | | | |
| 1 | water containing 0.5% of caustic soda and 0.2% of capric acid | 2 | 80 | 95 |
| 2 | water containing 0.5% of caustic soda and 0.2% of undecylenic acid | 2 | 80 | 98 |
| 3 | water containing 0.5% of caustic soda and 0.2% of lauric acid | | 80 | 100 |
| 4 | water containing 0.5% of caustic soda and 0.2% of palmitic acid | 2 | 80 | 100 |
| 5 | water containing 0.5% of caustic soda and 0.2% of oleic acid | 2 | 80 | 98 |
| Comparison | | | | |
| 6 | 5% caustic soda aqueous solution | 3 | 80 | 100 |
| 7 | water containing 5% of caustic soda and 0.2% of sodium dodecyl benzenesulfonate | 2 | 80 | 85 |
| 8 | 0.5% caustic soda aqueous solution | 2 | 80 | 21 |
| 9 | water containing 0.5% of caustic soda and 0.2% of sucrose monopalmitate | 3 | 80 | 46 |
| 10 | water containing 0.5% of caustic soda and 0.2% of caproic acid | 2 | 80 | 28 |

Table 2

| Sample No. | Browning Speed | Yield (%) | Hardness | Flavor |
|---|---|---|---|---|
| Present Invention | | | | |
| 3 | low | 93 | good | good |
| 4 | low | 94 | good | good |
| Comparison | | | | |
| 7 | extremely high | 79 | ordinary | ordinary |
| 8 | high | 84 | good | ordinary |

EXAMPLE 2

This Example illustrates peeling of apricots.

Apricots (variety: Heiwa) were dipped in a peeling solution maintained at a predetermined temperature for a certain period.

After the dipping treatment, the treated apricots were washed with water and the peeling state was examined to obtain the results shown in Table 3.

Table 3

| Sample No. | Peeling Solution | Treatment Time (min) | Treatment Temperature (°C.) | Peeling Ratio (%) |
|---|---|---|---|---|
| Present Invention | | | | |
| 11 | water containing 3% of caustic soda and 0.2% of lauric acid | 1.5 | 85 | 100 |
| 12 | water containing 3% of caustic soda and 0.2% of myristic acid | 1.5 | 85 | 100 |
| 13 | water containing 3% of caustic soda and 0.2% of oleic acid | 1.5 | 85 | 95 |
| 14 | water containing 3% of caustic soda and 0.2% of capric acid | 1.5 | 85 | 95 |
| Comparison | | | | |
| 15 | 30% caustic soda aqueous solution | 1.5 | 85 | 95 |
| 16 | 3% caustic soda aqueous solution | 1.5 | 85 | 0 |
| 17 | water containing 3% of caustic soda and 0.2% of caprylic acid | 1.5 | 85 | 45 |
| 18 | water containing 3% of caustic soda and 0.2% of sucrose oleate | 1.5 | 85 | 28 |

Each of the samples treated with the peeling solutions of the present invention and then washed with water had a smooth surface, but each of the samples treated with the comparative peeling solutions and then washed with water had convexities and concavities on the surface.

EXAMPLE 3

Peach fruits were divided into two pieces, and subjected to the dipping treatment in a peeling solution maintained at 80° C. for a predetermined period.

After the treatment, the treated fruit pieces were washed with water and the peeling state was examined to obtain the results shown in Table 4.

Table 4

| Sample No. | Peeling Solution | Treatment Time (min) | Peeling Ratio (%) |
|---|---|---|---|
| Present Invention | | | |
| 5 | water containing 0.5% of caustic soda and 0.2% of oleic acid | 2 | 100 |
| 3 | water containing 0.5% of caustic soda and 0.2% of lauric acid | 2 | 100 |
| Comparison | | | |
| 6 | 5% caustic soda aqueous solution | 2 | 90 |
| 7 | water containing 5% of caustic soda and 0.2% of sodium dodecyl benzene-sulfonate | 2 | 98 |
| 8 | 0.5% caustic soda aqueous solution | 2 | 10 |
| 10 | water containing 0.5% of caustic soda and 0.2% of caproic acid | 2 | 22 |
| 19 | water containing 0.5% of | | |

Table 4-continued

| Sample No. | Peeling Solution | Treatment Time (min) | Peeling Ratio (%) |
|---|---|---|---|
| | caustic soda and 0.2% of polyoxyethylene sorbitan oleate | 2 | 41 |

Each of the samples treated by the peeling solutions of the present invention and then washed with water had a smooth surface, but each of the samples treated by the comparative peeling solutions and then washed with water had convexities and concavities on the surface thereof.

EXAMPLE 4

This Example illustrates the adaptability of the waste water from the peeling step to the waste water treatment. More specifically, the peeling solutions used for the peeling treatment in Examples 1 and 3 were tested with respect to the adaptability to the waste water treatment in the following manner.

The peeling solution from the peeling step was mixed with calcium hydroxide so that the concentration of calcium hydroxide was 1%. Then, the solution was agitated and allowed to stand still for 30 minutes to form flocs. Then, the solution was filtered through two piled gauze sheets.

The total organic carbon (TOC) was measured by a TOC measurement apparatus manufactured by Toshiba-Beckmann before and after addition of calcium hydroxide and filtration treatment, and the TOC removal ratio was calculated to obtain the results shown in Table 5.

Table 5

| Sample No. | Fruit Treated | Peeling Solution | TOC ppm before treatment | TOC ppm after treatment | removal ratio (%) |
|---|---|---|---|---|---|
| 3 | white peach | water containing 0.5% of caustic soda and 0.2% of lauric acid | 1385 | 300 | 78.3 |
| 6 | white peach | 5% caustic soda aqueous solution | 1515 | 817 | 46.1 |
| 5 | peach | water containing 0.5% of caustic soda and 0.2 of oleic acid | 1425 | 240 | 83.2 |
| 7 | peach | water containing 5% of caustic soda and 0.2% of sodium dodecyl benzene-sulfonate | 1759 | 1122 | 36.2 |

EXAMPLE 5

In this Example, peeling of white peaches is illustrated.

White peaches were dipped in warm water for 30 seconds and each fruit was cut into 4 pieces. The cut pieces were subjected to the peeling treatment in a peeling solution maintained at a predetermined temperature for a certain period. After the treatment, the treated fruit pieces were dipped in a 0.05 N aqueous solution of citric acid for 30 seconds and washed with water, and the peeling ratio was examined. The peeling ratio means the ratio of the number of completely peeled fruit pieces to the total number of the treated fruit pieces. The obtained results are shown in Table 6.

Table 6

| Sample No. | Peeling Solution | Treatment Time (min) | Treatment Temperature (°C.) | Peeling Ratio (%) |
|---|---|---|---|---|
| Present Invention | | | | |
| 20 | water containing 0.5% of caustic soda, 0.1% of lauric acid and 0.1% of sucrose mono-oleate (HLB = 13) | 3 | 75 | 100 |
| 21 | water containing 0.5% of caustic soda, 0.1% of myristic acid and 0.1% of polyoxyethylene(20) sorbitan oleate (HLB = 15) | 3 | 75 | 100 |
| 22 | water containing 0.5% of caustic soda, 0.1% of oleic acid and 0.1% of sorbitan monolaurate (HLB = 8) | 3 | 75 | 100 |
| Comparison | | | | |
| 23 | 5% caustic soda aqueous solution | 3 | 85 | 72 |
| 24 | 0.5% caustic soda aqueous solution | 3 | 85 | 11 |
| 25 | water containing 0.5% of caustic soda and 0.2% of sucrose mono-oleate (HLB = 13) | 3 | 75 | 38 |
| 26 | water containing 0.5% of caustic soda and 0.2% of capric acid | 3 | 75 | 88 |

White peaches treated with the peeling solutions of Sample Nos. 20, 21, 22, 23 and 25 shown in Table 6 were examined with respect to the browning speed, hardness and flavor to obtain the results shown in Table 7.

Table 7

| Sample No. | Treatment Time (min) | Treatment Temperature (°C.) | Browning Speed | Yield (%) | Hardness | Flavor |
|---|---|---|---|---|---|---|
| Present Invention | | | | | | |
| 20 | 3 | 75 | low | 95 | good | good |
| 21 | 3 | 75 | low | 94 | good | good |
| 22 | 3 | 75 | low | 95 | good | good |
| Comparison | | | | | | |
| 23 | 3 | 85 | extremely | 77 | soft | bad |

Table 7-continued

| Sample No. | Treatment Time (min) | Treatment Temperature (°C.) | Browning Speed | Yield (%) | Hardness | Flavor |
|---|---|---|---|---|---|---|
| 25 | 3 | 75 | high high | 89 | good | ordinary |

EXAMPLE 6

This Example illustrates peeling of apples.

Apples of a variety shown below were dipped in a peeling solution maintained at a predetermined temperature for a certain period.

After the dipping treatment, the treated apples were washed with water and the peeling state was examined to obtain the results shown in Table 8.

Table 8

| Sample No. | Peeling Solution | Variety of Apple | Treatment Time (min) | Treatment Temperature (°C.) | Peeling Ratio (%) |
|---|---|---|---|---|---|
| Present Invention | | | | | |
| 27 | water containing 3% of caustic soda, 0.1% of lauric acid and 0.1% of sucrose oleate (HLB = 13) | Kokko | 3 | 85 | 100 |
| | | Star King | 3 | 85 | 100 |
| | | Kogyoku | 2.5 | 85 | 100 |
| | | Fuji | 2 | 85 | 100 |
| 28 | water containing 3% of caustic soda, 0.1% of stearic acid, 0.05% of sorbitan oleate (HLB = 4.3) and 0.05% of polyoxyethylene(20) sorbitan laurate (HLB = 18) (HLB of mixture of two non-ionic surface active agents being about 11.2) | Kokko | 3 | 85 | 100 |
| | | Star King | 3 | 85 | 100 |
| | | Kogyoku | 2.5 | 85 | 100 |
| | | Fuji | 2 | 85 | 100 |
| Comparison | | | | | |
| 29 | 30% caustic soda aqueous solution | Kokko | 3 | 85 | 100 |
| | | Star King | 3 | 85 | 99 |
| | | Kogyoku | 2.5 | 85 | 100 |
| | | Fuji | 2 | 85 | 100 |
| 30 | 3% caustic soda aqueous solution | Kokko | 3 | 85 | 0 |
| | | Star King | 3 | 85 | 0 |
| | | Kogyoku | 2.5 | 85 | 0 |
| | | Fuji | 2 | 85 | 0 |
| 31 | water containing 3% of caustic soda and 0.2% of sucrose oleate (HLB = 13) | Kokko | 3 | 85 | 15 |
| | | Star King | 3 | 85 | 20 |
| | | Kogyoku | 2.5 | 85 | 35 |
| | | Fuji | 2 | 85 | 30 |

The apples treated with the peeling solutions of Sample Nos. 27, 28, 29, 30 and 31 shown in Table 8 were tested with respect to the browning speed and flavor to obtain results shown in Table 9.

Table 9

| Sample No. | Browning Speed | Flavor |
|---|---|---|
| Present Invention | | |
| 27 | slightly low | good |
| 28 | slightly low | good |
| Comparison | | |
| 29 | high | lost |
| 30 | slightly high | ordinary |
| 31 | slightly high | good |

EXAMPLE 7

This Example illustrates the adaptability of the waste water from the peeling step to the waste water treatment. More specifically, the peeling solutions used for the peeling treatment in Example 5 were tested with respect to the adaptability to the waste water treatment in the following manner.

The peeling solution from the peeling step was mixed with calcium hydroxide so that the concentration of calcium hydroxide was 1%. Then, the solution was agitated and allowed to stand still for 30 minutes to form flocs. Then, the solution was filtered through two piled gauze sheets.

The total organic carbon (TOC) was measured by a TOC measurement apparatus manufactured by Toshiba-Beckmann before and after addition of calcium hydroxide and filtration treatment, and the TOC removal ratio was calculated to obtain the results shown in Table 10.

Table 10

| Sample No. | Fruit Treated | Peeling Solution | ppm after treatment | ppm after treatment | removal ratio (%) |
|---|---|---|---|---|---|
| 20 | peach | water containing 0.5% caustic soda, 0.1% of lauric acid and 0.1% of sucrose monooleate (HLB = 13) | 1305 | 300 | 77 |
| 23 | peach | 5% caustic soda aqueous solution | 1620 | 956 | 41 |

We claim:

1. A method for peeling fruits or vegetables, which consists essentially of the step of: immersing the fruit or vegetable in an aqueous alkaline solution consisting essentially of (1) from 0.1 to 3.0 percent by weight of an akali, (2) from 0.005 to 1.0 percent by weight of an acid selected from the group consisting of undecylenic acid, lauric acid, myristic acid, palmitic acid, palmitoleic acid, oleic acid, linoleic acid, linolenic acid and stearic acid, and (3) the balance being essentially water, until the fruit or vegetable is substantially completely peeled.

2. A method as claimed in claim 1 in which said alkali is caustic soda and the amount of said caustic soda is from 0.2 to 0.5 percent by weight.

3. A method as claimed in claim 1 or claim 2 in which said acid is undecylenic acid and the amount of said acid is 0.1 to 1.0 percent by weight.

4. A method as claimed in claim 1 or claim 2 in which said acid is lauric acid and the amount of said acid is 0.1 to 1.0 percent by weight.

5. A method as claimed in claim 1 or claim 2 in which said acid is palmitic acid and the amount of said acid is 0.1 to 1.0 percent by weight.

6. A method as claimed in claim 1 or claim 2 in which said acid is oleic acid and the amount of said acid is 0.1 to 1.0 percent by weight.

7. A method as claimed in claim 1 or claim 2 in which said acid is myristic acid and the amount of said acid is 0.1 to 1.0 percent by weight.

8. A method for peeling fruits or vegetables, which consists essentially of the step of: immersing the fruit or vegetable in an aqueous alkaline solution consisting essentially of (1) from 0.1 to 3.0 percent by weight of an alkali, (2) from 0.005 to 1.0 percent by weight of an acid selected from the group consisting of undecylenic acid, lauric acid, myristic acid, palmitic acid, palmitoleic acid, oleic acid, linoleic acid, linolenic acid and stearic acid, (3) from 0.005 to 1.0 percent by weight of a nonionic surface active agent or a mixture of nonionic surface active agents having an HLB value of 6 to 18 and selected from the group consisting of polyoxyethylene sorbitan fatty acid esters, sucrose fatty acid esters, sorbitan fatty acid esters, glycerin fatty acid esters and propylene glycol fatty acid esters, and (4) the balance being essentially water, until the fruit or vegetable is substantially completely peeled.

9. A method as claimed in claim 8 in which said alkali is caustic soda and the amount of said caustic soda is from 0.2 to 0.5 percent by weight.

10. A method as claimed in claim 8 or claim 9 in which said acid is undecylenic acid and the amount of said acid is 0.1 to 1.0 percent by weight.

11. A method as claimed in claim 8 or claim 9 in which said acid is lauric acid and the amount of said acid is 0.1 to 1.0 percent by weight.

12. A method as claimed in claim 8 or claim 9 in which said acid is palmitic acid and the amount of said acid is 0.1 to 1.0 percent by weight.

13. A method as claimed in claim 8 or claim 9 in which said acid is oleic acid and the amount of said acid is 0.1 to 1.0 percent by weight.

14. A method as claimed in claim 8 or claim 9 in which said acid is myristic acid and the amount of said acid is 0.1 to 1.0 percent by weight.

* * * * *